(12) United States Patent
Hasegawa (10) Patent No.: US 7,309,223 B2
(45) Date of Patent: Dec. 18, 2007

(54) EXTRUSION HEAD DEVICE

(75) Inventor: Nobuo Hasegawa, Kanagawa-ken (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 109 days.

(21) Appl. No.: 11/184,948

(22) Filed: Jul. 20, 2005

(65) Prior Publication Data

US 2006/0018987 A1    Jan. 26, 2006

(30) Foreign Application Priority Data

Jul. 20, 2004 (JP) ............................. 2004-211110
Jun. 23, 2005 (JP) ............................. 2005-183778

(51) Int. Cl.
*B29C 47/08* (2006.01)

(52) U.S. Cl. .............................. 425/192 R; 425/133.5; 425/188; 425/462

(58) Field of Classification Search ............. 425/133.5, 425/188, 192 R, 462
See application file for complete search history.

(56) References Cited

U.S. PATENT DOCUMENTS 4,666,392 A  *  5/1987  Gerloff et al. ............... 425/190
4,799,874 A  *  1/1989  Bellmer et al. ............ 425/131.1
4,824,353 A  *  4/1989  Hirschkorn ................. 425/190
5,332,380 A  *  7/1994  Unland ........................ 425/135
5,720,986 A  *  2/1998  Gohlisch et al. ......... 425/131.1
5,851,561 A  *  12/1998  Hirschkorn .............. 425/131.1
6,273,703 B1  *  8/2001  Hirschkorn ................. 425/188

FOREIGN PATENT DOCUMENTS

JP           2609261        6/1988

* cited by examiner

*Primary Examiner*—Robert Davis
*Assistant Examiner*—Joseph Leyson
(74) *Attorney, Agent, or Firm*—Finnegan, Henderson, Farabow, Garrett & Dunner, L.L.P.

(57) ABSTRACT

An extrusion head device in which fixed and movable head parts as a plurality of separate parts can be easily combined using compact fastening means. Fastening cylinder rods provided for the fixed head part of the extrusion head device including the fixed and movable head parts are expanded, whereby fore-end locking portions at tips of the fastening cylinder rods are inserted into through holes of engaging blocks provided for the movable head to be protruded from upper surfaces of the engaging blocks; stopper-operating cylinder rods provided for the movable head part are expanded, whereby U-shaped stoppers at tips of the stopper-operating cylinder rods are inserted into clearances between the locking portions and the engaging blocks; and then the fastening cylinder rods are contracted, whereby the movable and fixed head parts are brought into tight contact with each other and fastened together.

10 Claims, 6 Drawing Sheets

EXTRUSION HEAD DEVICE

BACKGROUND OF THE INVENTION

The present invention relates to an extrusion head device which is coupled to rubber- or resin-extruding machines. More specifically, the present invention relates to an extrusion head device in which fixed head parts and movable head parts as a plurality of separate parts can be easily combined using compact fastening means.

In extrusion heads which are coupled to rubber- or resin-extruding machines, each passage for extruded material is often separated along the longitudinal direction into upper and lower portions provided in a plurality of head parts. Such an openable and closable structure of an extrusion head having a plurality of head parts separated makes it easy to remove extruded material remaining in the passages and to perform cleaning and maintenance. In this separate-type extrusion head, at the time of extrusion, the separate head parts must be reliably combined so that extruded material does not leak from the mating surface.

Fastening means provided in such a separate-type extrusion head has been proposed in, for example, Japanese Patent Publication No. 2609261. In this proposal, a separate-type head unit includes a fixed head part and a movable head part, and is provided with hammer-shaped tip portions which can be expanded from the fixed head part side by cylinder rods. These hammer-shaped tip portions pass through recessed portions which are shaped like through holes and provided on the movable head part side, then rotate about the rod axes by 90 degrees, and are hung on the top end surfaces of the recessed portions. Thereafter, the cylinder rods move in the contracting direction, whereby the movable head part is pressed against the fixed head part by the hammer-shaped tip portions to be fastened thereto.

However, this proposal requires rotation mechanisms for rotating the cylinder rods about the axes thereof, in addition to mechanisms for moving the cylinder rods forward and backward. Accordingly, there is the problem that the structure becomes complicated.

Further, when the movable head part is fastened to the fixed head part, large compressive stress acts on contact portions between the hammer-shaped tip portions and the end surfaces of the recessed portions. Accordingly, in the case where the hammer-shaped tip portions are small, there is the problem that the contact portions are prone to deformation. If the hammer-shaped tip portions are widened in order to reduce the deformation, there is a need of sufficient spaces to allow the hammer-shaped tip portions to operate without interfering with other portions. Accordingly, there is the problem that the entire head becomes considerably large.

SUMMARY OF THE INVENTION

An object of the present invention is to provide an extrusion head device in which head parts as a plurality of separate parts can be easily and reliably combined while fastening means is made compact.

In order to achieve the above-described object, an extrusion head device of the present invention includes a fixed head part and a movable head part. The fixed and movable head parts are provided to separate an extrusion passage along a longitudinal direction. The movable head part is pivotally supported to the fixed head part to be rotationally movable. The extrusion passage is opened and closed by rotationally moving the movable head part. The fixed and movable head parts are brought into tight contact with each other by fastening means. The fastening means comprises: a fastening rod which linearly moves forward from the fixed head part toward a movable head part side and linearly moves back toward the fixed head part; and a stopper-operating cylinder rod which is provided for the movable head part and which moves forward and backward to intersect an extension line of the fastening rod. A fore-end locking portion of the fastening rod is locked and released by a stopper attached to the stopper-operating cylinder rod.

The fastening means provided in the present invention has a simple structure including: the fastening rod which linearly moves forward from the fixed head part toward the movable head part side and linearly moves back toward the fixed head part; and the stopper-operating cylinder rod which linearly moves forward and backward along a direction intersecting an extension line of the fastening rod. Accordingly, the fastening means requires only a small space for movement because of not having a rotation mechanism, and can be constructed as a compact structure.

Moreover, the fastening means has a structure in which contact areas of the fore-end locking portion and the stopper subjected to fastening force can be easily increased. This structure makes it possible to reduce stress to perform reliable fastening even when large fastening force occurs, and therefore can prevent extruded material from leaking from the mating surface between the head parts.

DETAILED DESCRIPTION OF THE PREFERRED EMBODIMENTS

Hereinafter, an extrusion head device of the present invention will be described based on an embodiment shown in the drawings.

Figure 1:
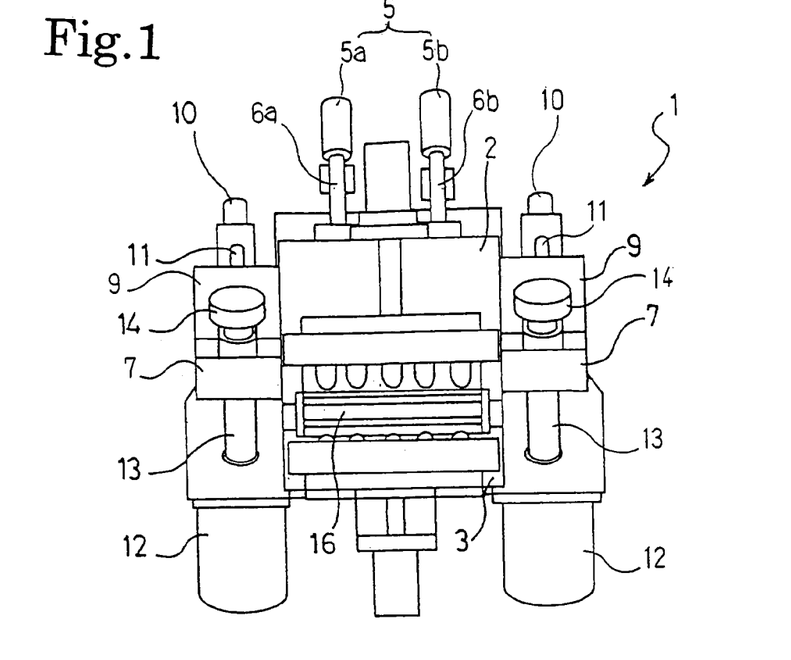
FIG. 1 is a front view showing one example of an extrusion head device of the present invention.
Figure 2:
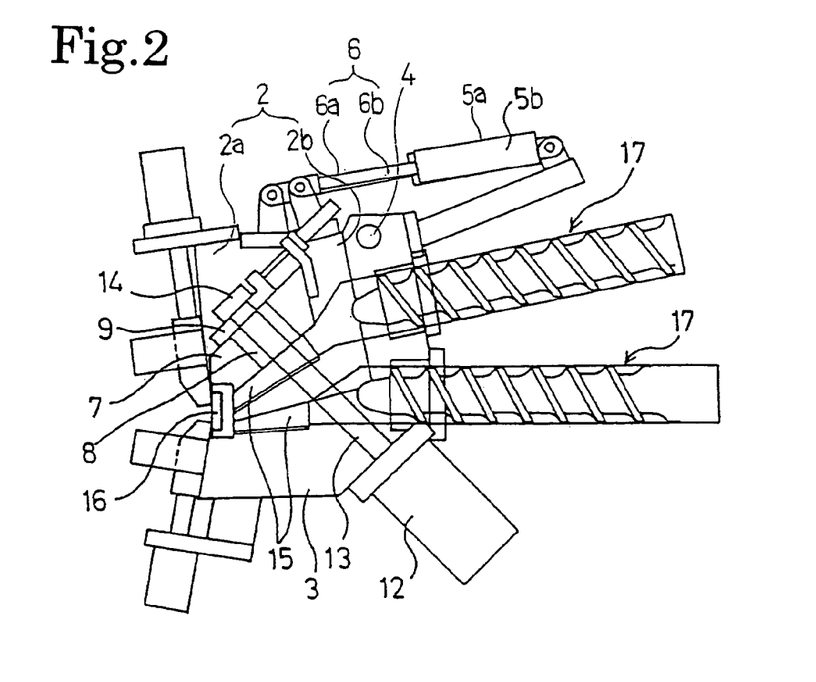
FIG. 2 is a partially see-through side view showing the device of FIG. 1.

As shown in FIGS. 1 and 2, two extruding machines 17 are attached to an extrusion head device 1. In the extrusion head device 1, extrusion passages 15 are formed through which extruded material is passed from each exhaust port of the extruding machines 17 to a die 16. The extrusion head device 1 is constituted of a fixed head part 3 and a movable head part 2. The movable head part 2 is further constituted of an upper head part 2a and a middle head part 2b. One of the two extrusion passages 15 is formed so as to be separated along the longitudinal direction into portions respectively provided in the middle head part 2b and the fixed head part 3. The other of the two extrusion passages 15 is formed so as to be separated into portions respectively provided in the upper head part 2a and the middle head part 2b. The fixed head part 3 is coupled to the extruding machines 17 with flange portions interposed therebetween.

Figure 3:
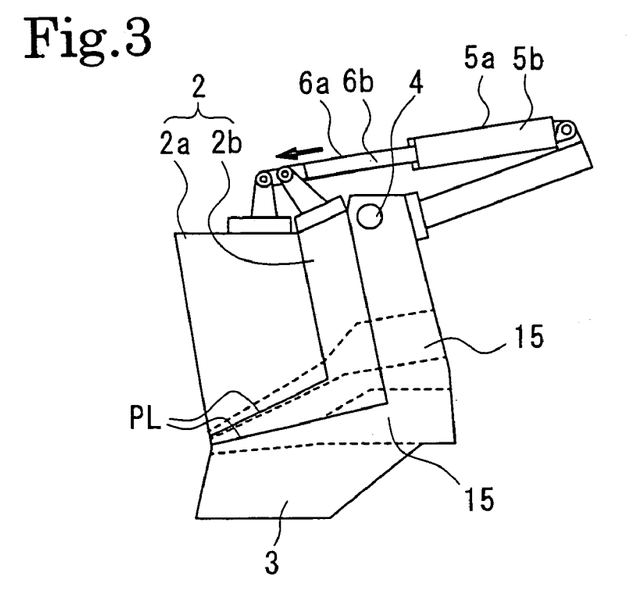
FIG. 3 is a partially omitted side view showing a situation in which a movable head part and a fixed head part constituting the extrusion head device of the present invention are closed.
Figure 4:
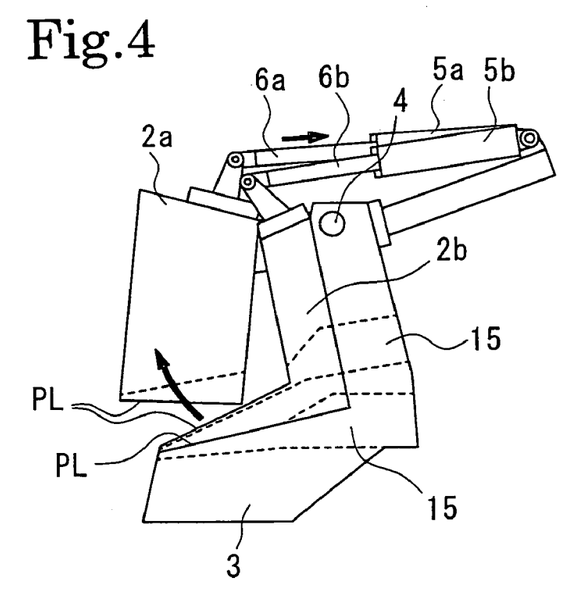
FIG. 4 is a partially omitted side view showing a situation in which the movable head part and the fixed head part constituting the extrusion head device of the present invention are opened.

FIGS. 3 and 4 show the relationship between the movable head part 2 and the fixed head part 3 constituting the extrusion head device 1 in the state where some of the components are omitted.

FIG. 3 shows a situation in which the movable head part 2 is closed onto the fixed head part 3 to close the two extrusion passages 15. FIG. 4 shows a situation in which the extrusion passages 15 are opened. The upper head part 2a and the middle head part 2b are pivotally supported by a support shaft 4 in the vicinity of an upper corner portion of the fixed head part 3 so as to be rotationally movable. As shown in FIG. 3, the upper head part 2a is rotationally moved toward the middle head part 2b about the support shaft 4 by the expansion of an upper head opening-and-closing cylinder rod 6a of an upper head opening-and-closing fluid cylinder 5a, thus closing the extrusion passages 15. Further, as shown in FIG. 4, the contraction of the upper head opening-and-closing cylinder rod 6a rotationally moves the upper head part 2a away from the middle head part 2b about the support shaft 4, thus opening the extrusion passages 15. Similarly, the middle head 2b is rotationally moved about the support shaft 4 by the movement of a middle head opening-and-closing cylinder rod 6b forward and backward of a middle head opening-and-closing fluid cylinder 5b, thus closing and opening the extrusion passages 15. As the opening-and-closing fluid cylinders 5, oil-hydraulic cylinders or air cylinders can be used.

On two opposite side surfaces of the upper head part 2a, engaging blocks 7 are fixed. In the engaging blocks 7, through holes 8 are provided which pass through the engaging blocks 7 from the fixed head part 3 side toward the upper head part 2a side. Further, U-shaped stoppers 9 which can move back and forth on upper surfaces of the engaging blocks 7 are mounted on the upper surfaces. The U-shaped stoppers 9 are attached to tips of stopper-operating cylinder rods 11 of stopper-operating fluid cylinders 10. The forward and backward movements of these stopper-operating cylinder rods 11 cause the stoppers 9 to move alternately to the positions of the through holes 8 and positions away from the through holes 8 on the upper surfaces of the engaging blocks 7. As the stopper-operating fluid cylinders 10, oil-hydraulic cylinders or air cylinders can be used. Incidentally, in FIG. 5, the upper head part 2a and the middle head part 2b are formed into one part to be the movable head part 2 so that the structure is simplified and shown.

Figure 5:
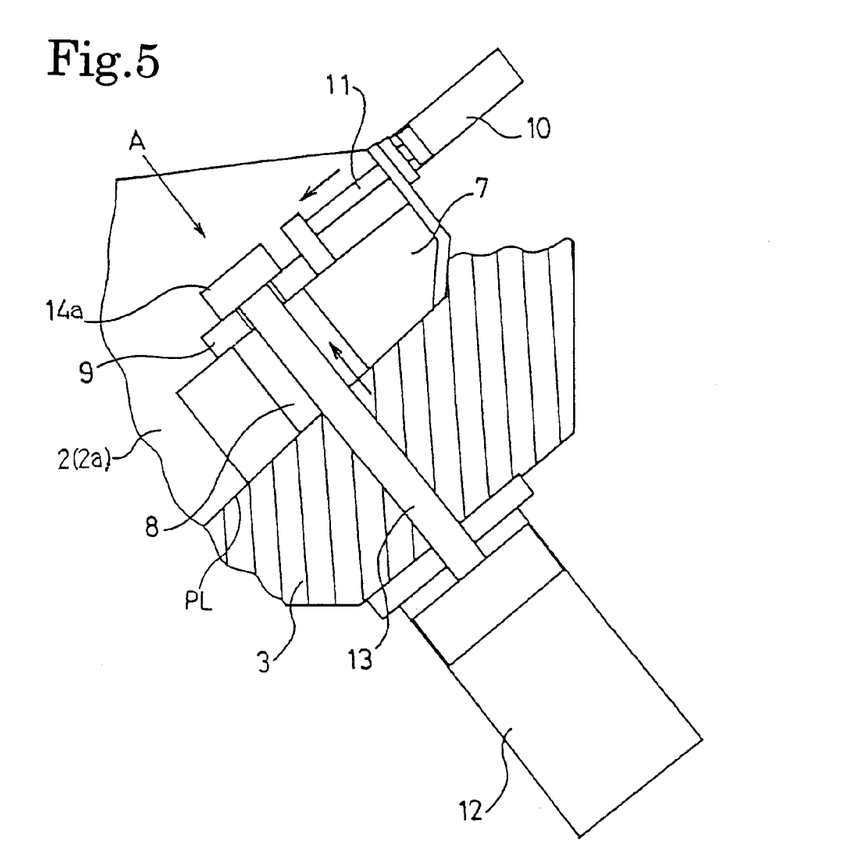
FIG. 5 is a partially see-through side view showing a region around an engaging block of the extrusion head device of the present invention.

On the other hand, on two opposite side surfaces of the fixed head part 3, fastening cylinders 12 are provided. Fastening cylinder rods 13 of the fastening cylinders 12 have fore-end locking portions 14a at tips thereof. The fore-end locking portions 14a have diameters larger than the rod diameters. The fastening cylinder rods 13 move upward and downward in the through holes 8 of the engaging blocks 7 provided for the movable head part 2, whereby the fore-end locking portions 14a at the tips of the fastening cylinder rods 13 are protruded from the upper surfaces of the engaging blocks 7. As the fastening cylinders 12, oil-hydraulic cylinders or air cylinders can be used.

Figure 6:
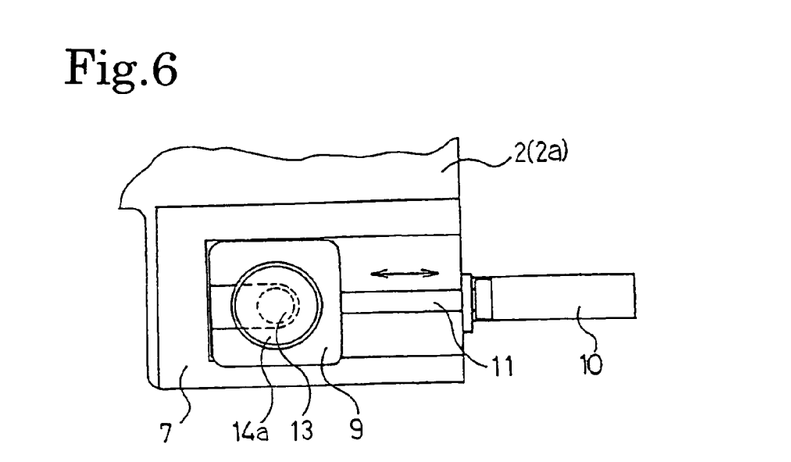
FIG. 6 is a top view from the direction of arrow A of FIG. 5.

As described above, the U-shaped stoppers 9 can lock or release the fore-end locking portions 14a protruded from the upper surfaces of the engaging blocks 7 in such a way that the U-shaped stoppers 9 enter or move back from the spaces under the fore-end locking portions 14a when the fore-end locking portions 14a are protruded upward. The shapes of the stoppers 9 only need to be shapes in which the stoppers 9 can be inserted into the clearances between the fore-end locking portions 14a protruded from the through holes 8 and the engaging blocks 7 to lock the fore-end locking portions 14a. In particular, the stoppers 9 preferably have cutout portions which surround the fastening cylinder rods 13. These cutout portions make it possible to reliably and stably lock the fore-end locking portions 14a on the engaging blocks 7.

On the other hand, the shapes of the fore-end locking portions 14a are not limited to cylindrical shapes, but only need to be shapes in which the fore-end locking portions 14a can be locked by the stoppers 9 when being protruded from the through holes 8. For example, fore-end locking portions 14a are used which have protruding portions or recessed portions in the radial directions perpendicular to the axes of the fastening cylinder rods 13. The through holes 8 are formed in shapes which are slightly larger than those of the fore-end locking portions 14a.

Hereinafter, the operation of opening/closing the movable head part 2 from/onto the fixed head part 3 will be described. In the case where the movable head part 2 is combined with and fastened to the fixed head part 3, as shown in FIG. 3, the opening-and-closing cylinder rods 6 are expanded, whereby the movable head part 2 is closed onto the fixed head part 3 to be combined therewith. Then, as shown in FIG. 5, the fastening cylinder rods 13 of the fastening cylinders 12 are expanded, whereby the fore-end locking portions 14a are protruded over the through holes 8 of the engaging blocks 7. Subsequently, as shown in FIG. 6, the stopper-operating cylinder rods 11 of the stopper-operating cylinders 10 are expanded, whereby the U-shaped stoppers 9 are inserted into the clearances between the fore-end locking portions 14a and the engaging blocks 7 so as to surround the fastening cylinder rods 13.

In this state, when the fastening cylinder rods 13 are moved backward in the contracting direction, the fore-end locking portions 14a press the movable head part 2 against the fixed head part 3 through the engaging blocks 7. This pressing brings the movable head part 2 and the fixed head part 3 into tight contact with each other without clearance at the mating surface PL, and securely fastens them together.

As described above, fastening means for combining the movable head part 2 with the fixed head part 3 has a simple structure including: the fastening cylinder rods 13, as fastening rods, which linearly move forward from the fixed head part 3 toward the movable, head part 2 side and linearly move back toward the fixed head part 3; and stopper-operating cylinder rods 11 which linearly move forward and backward along a direction intersecting extension lines of the fastening cylinder rods 13. Accordingly, the fastening means requires only a small space for movement, and can be made compact and manufactured at low cost.

Further, the fore-end locking portions 14*a* and the U-shaped stoppers 9, which are subjected to fastening force, have structures in which the contact areas can be easily increased. Because of these structures, when fastening force is large, stress can be reduced by increasing the contact areas, whereby adhesive strength between the head parts 2 and 3 can be improved. For example, in a rubber-extruding machine, there are cases where extrusion pressure reaches 25 MPa. Such a large pressure can be easily dealt with. In the case where fastening force is small, the entire fastening means can be miniaturized by reducing the contact areas of the fore-end locking portions 14*a* and the U-shaped stoppers 9.

Moreover, there occurs tensile stress in the fastening cylinder rods 13 at the time of fastening. This tensile stress can be easily reduced by increasing the rod diameters or the like, or can also be reduced by increasing the strength of the material of the fastening cylinder rods 13.

On the other hand, in the case where fastening is released to open the movable head part 2 from the fixed head part 3, a procedure reverse to the aforementioned fastening procedure is carried out. Accordingly, fastening can be easily released, and the extrusion passages 15 can be easily cleaned and maintained.

Figure 7:
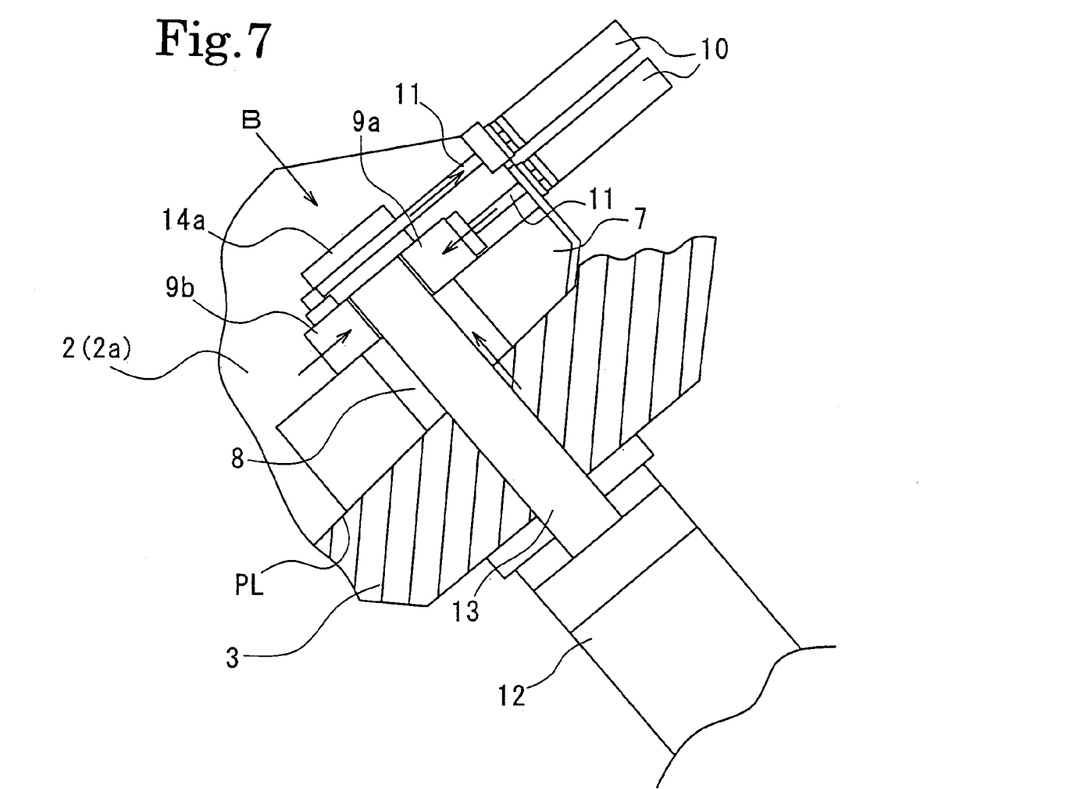
FIG. 7 is a partially see-through side view showing a region around an engaging block using another stopper as another embodiment of the extrusion head device of the present invention.
Figure 8:
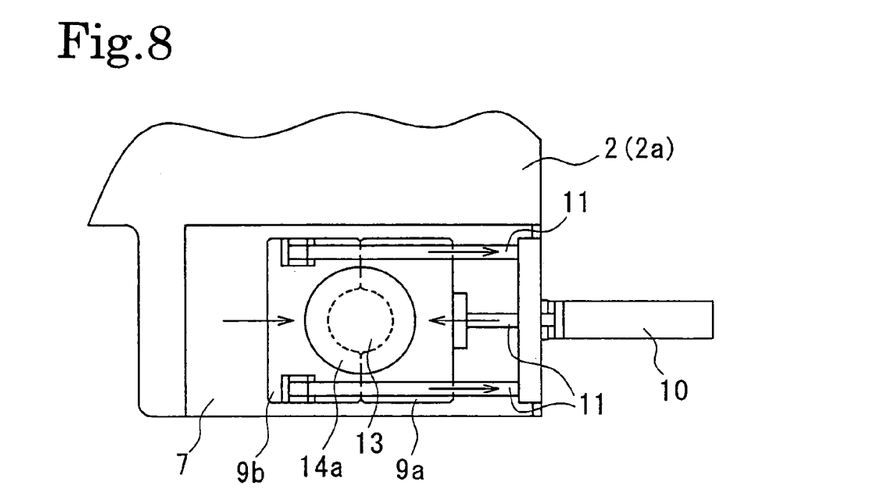
FIG. 8 is a top view from the direction of arrow B of FIG. 7.

In the case where fastening force is very large and the like, stoppers 9*a*, 9*b* shown in FIGS. 7 and 8 may be used, replacing the stoppers 9 shown in FIGS. 5 and 6. FIG. 7 is a partially see-through side view of a region around the engaging block 7. FIG. 8 is a top view from the direction of arrow B of FIG. 7. Both stoppers 9*a*, 9*b* are a U-shape, and respectively move back and forth on the upper surface of the engaging block 7 by the movements of the stopper-operating cylinder rods 11, 11 forward and backward. Thus, the cut out portions of both stoppers 9*a*, 9*b* face to and become in contact with each other.

When the movable head part 2 is fastened to the fixed head part 3, both stoppers 9*a*, 9*b* are separated from each other so as to be placed at a position shifted from the upper portion of the through hole 8 of the engaging block 7. Next, the fastening cylinder rod 13 is expanded so that the fore-end locking portion 14*a* is protruded over the engaging block 7. Thus one stopper 9*a* is moved forth by expanding the stopper-operating cylinder rods 11 thereof, and the other stopper 9*b* is moved back by contracting the stopper-operating cylinder rods 11 thereof.

Thereby, both stoppers 9*a*, 9*b* are inserted between the fore-end locking portion 14*a* and the engaging block 7, and the cut out portions each other form a through hole to surround the fastening cylinder rod 13. In this state, if the fastening cylinder rod 13 is contracted, the fore-end locking portion 14*a* is locked and the movable head part 2 and the fixed head part 3 are brought into tight contact with each other and fastened.

As described above, by use of this stoppers 9*a*, 9*b*, the contact area of the both stoppers 9*a*, 9*b* and the fore-end locking portion 14*a* can be wastelessly maximized. Therefore, even when large fastening force acts on the contact area, stress on the contact portions can be reduced and the movable head part 2 and the fixed head part 3 can be brought into tight contact with each other and fastened.

Figure 9:
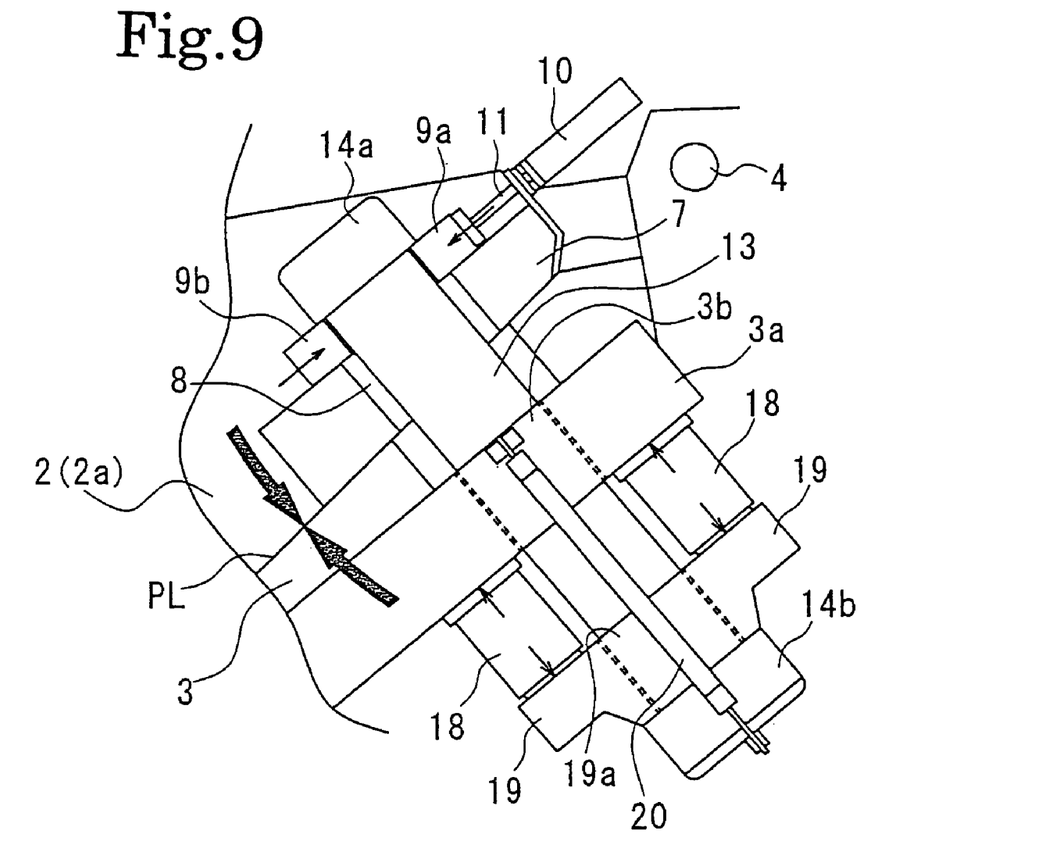
FIG. 9 is a partially omitted side view showing a situation in which the movable head part and the fixed head part are brought into tight contact with each other by another fastening means as still another embodiment of the extrusion head device of the present invention.
Figure 10:
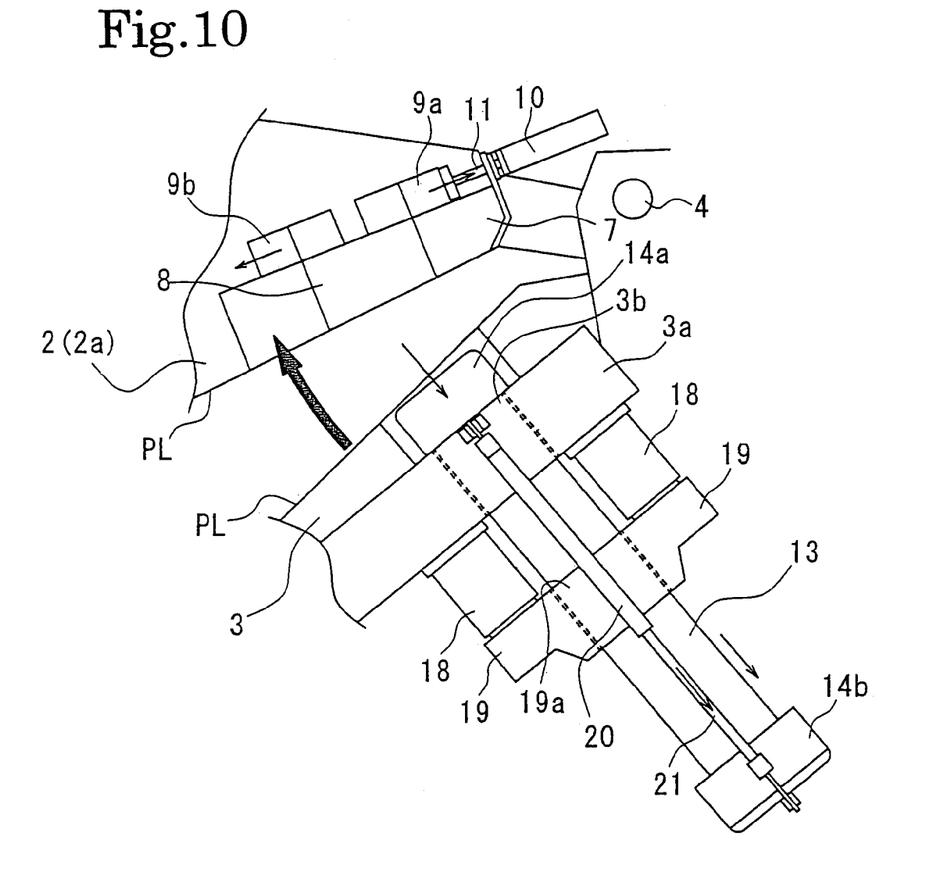
FIG. 10 is a partially omitted side view showing a situation in which the fastening by the fastening means of FIG. 9 is released and the movable head part and the fixed head part are separated away from each other.

Further, fastening means as shown in FIGS. 9 and 10 also can be used in order to fasten the movable head part 2 to the fixed head part 3. FIG. 9 is a side view showing a situation in which the movable head part 2 is fastened to the fixed head part 3 and the unillustrated extrusion passage 15 is closed. FIG. 10 is a side view showing a situation in which the passage is opened. Both illustrations are shown with a part of components omitted.

In this fastening means, a fastening rod 13 is utilized, replacing the fastening cylinder rod 13 shown in FIG. 7, the fastening rod 13 having the fore-end locking portion 14*a* at the fore end thereof and a rear-end locking portion 14*b* at the rear end thereof, both of which are cylindrical shapes and have larger diameters respectively. As shown in FIG. 9, this fastening rod 13 passes through the through hole 8 of the engaging block 7 provided for the movable head part 2, and the fore-end locking portion 14*a* is protruded.

A jack fixing block 3*a* is fixed to and protruded from the fixed head part 3 at a position closer to the movable head part 2 side than the rear-end locking portion 14*b*. The fastening rod 13 passes through a through hole 3*b* of the jack fixing block 3*a* and a through hole 19*a* of a flange-shaped clamp block 19, and the rear-end locking portion 14*b* is brought into contact with the clamp block 19.

Two jacks 18 are provided between the rear-end locking portion 14*b* and the jack fixing block 3*a* at both sides of the fastening rod 13, with the clamp block 19 interposed between the jacks 18 and the rear-end locking portion 14*b*. Further, a back-and-forth movement fluid cylinder 20 is provided to the fastening rod, one end thereof being connected to the jack fixing block 3*a* and the other end being connected to the rear-end locking portion 14*b*.

When fastening the movable head part 2 and the fixed head part 3 by use of this fastening means, both stoppers 9*a*, 9*b* are inserted between the fore-end locking portion 14*a* and the engaging block 7, in a similar procedure as described in FIG. 7. Then, the jacks 18 are expanded so as to push the rear-end locking portion 14*b*, and the fore-end locking portion 14*a* is moved backward from the movable head part 2 side to the fixed head part 3 side. Thereby, the movable head part 2 is rotationally moved about the support shaft 4 and fastened to the fixed head part 3 so that the fixed head part 3 is brought into tight contact with a mating face PL.

On the other hand, when the fastening is released, the jacks 18 are contracted and both stoppers 9*a*, 9*b* are moved to release the locking between the fore-end locking portion 14*a* and the stoppers 9*a*, 9*b*. Then, as shown FIG. 10, a back-and-forth movement fluid cylinder rod 21 of the back-and-forth movement fluid cylinder 20 is expanded to move the fastening rod 13 backward to the fixed head part 3 side. The movable head part 2 is rotationally moved about the support shaft 4 by use of an unillustrated opening-and-closing fluid cylinders 5 to be an open state against the fixed head part 3. Incidentally, the clamp block 19 can be omitted.

As described above, since fastening force is generated by use of the jack 18 in this fastening means, the fastening oil-hydraulic cylinder 12 can be unnecessary, which is required to grow in size when large fastening force is needed. Further, since the back-and-forth movement fluid cylinder 20 only moves the fastening rod 13, large force is not needed to be generated. Therefore, the cylinder 20 can be reduced in size and cost. As the jack 18, an oil-hydraulic cylinder or mechanical jack can be used. The number of the jack 18 provided is not limited to that presented in the above-described embodiment.

In the present invention, the number of extruding machines 17 coupled to the fixed head part 3 and that of movable head parts 2 are not limited to those presented in the above-described embodiment.

What is claimed is:

1. An extrusion head device which comprises a fixed head part and a movable head part, the fixed and movable head parts being provided to separate an extrusion passage along a longitudinal direction, the movable head part being pivotally supported to the fixed head part to be rotationally movable, the extrusion passage being opened and closed by rotationally moving the movable head part, the fixed and movable head parts being brought into tight contact with each other by fastening means, the fastening means comprising a fastening rod which linearly moves forward from the fixed head part toward a movable head part side and linearly moves back toward the fixed head part and a stopper-operating cylinder rod which is provided for the movable head part and which moves forward and backward so as to intersect an extension line of the fastening rod, wherein the fastening rod has a fore-end locking portion that is locked and released by a stopper attached to the stopper-operating cylinder rod and has a rear-end locking portion, and wherein a jack fixing block is provided and fixed to the fixed head part at a position closer to the movable head part side than the rear-end locking portion, and the fastening rod is linearly moved forward and backward by expansion and contraction of a jack provided between the jack fixing block and the rear-end locking portion.

2. The extrusion head device according to claim 1, wherein the fastening rod is moved forward and backward using fluid.

3. The extrusion head device according to claim 1 or 2, wherein an engaging block having a through hole portion into which the fore-end locking portion can be inserted is provided for the movable head part, and the fore-end locking portion can be locked on the engaging block by inserting the stopper into a clearance between the fore-end locking portion protruded to an outside of the through hole portion and the engaging block.

4. The extrusion head device according to claim 1 or 2, wherein the stopper has a cutout portion which engages with the fastening rod.

5. The extrusion head device according to claim 3, wherein the stopper has a cutout portion which engages with the fastening rod.

6. An extrusion head device which comprises a fixed head part and a movable head part, the fixed and movable head parts being provided to separate an extrusion passage along a longitudinal direction, the movable head part being pivotally supported to the fixed head part to be rotationally movable, the extrusion passage being opened and closed by rotationally moving the movable head part, the fixed and movable head parts being brought into tight contact with each other by fastening means, the fastening means comprising a fastening rod which linearly moves forward from the fixed head part toward a movable head part side and linearly moves back toward the fixed head part and a stopper-operating cylinder rod which is provided for the movable head part and which moves forward and backward so as to intersect an extension line of the fastening rod, wherein the fastening rod has a fore-end locking portion that is locked and released by a stopper attached to the stopper-operating cylinder rod and wherein an engaging block having a through hole portion into which the fore-end locking portion can be inserted is provided for the movable head part, and the fore-end locking portion can be locked on the engaging block by inserting the stopper into a clearance between the fore-end locking portion protruded to an outside of the through hole portion and the engaging block.

7. The extrusion head device according to claim 6, wherein the fastening rod is moved forward and backward using fluid.

8. The extrusion head device according to claim 6 or 7, wherein the stopper has a cutout portion which engages with the fastening rod.

9. An extrusion head device which comprises a fixed head part and a movable head part, the fixed and movable head parts being provided to separate an extrusion passage along a longitudinal direction, the movable head part being pivotally supported to the fixed head part to be rotationally movable, the extrusion passage being opened and closed by rotationally moving the movable head part, the fixed and movable head parts being brought into tight contact with each other by fastening means, the fastening means comprising a fastening rod which linearly moves forward from the fixed head part toward a movable head part side and linearly moves back toward the fixed head part and a stopper-operating cylinder rod which is provided for the movable head part and which moves forward and backward so as to intersect an extension line of the fastening rod, wherein the fastening rod has a fore-end locking portion that is locked and released by a stopper attached to the stopper-operating cylinder rod and wherein the stopper has a cutout portion which engages with the fastening rod.

10. The extrusion head device according to claim 9, wherein the fastening rod is moved forward and backward using fluid.

* * * * *